United States Patent
Choi et al.

(10) Patent No.: US 8,205,654 B2
(45) Date of Patent: Jun. 26, 2012

(54) COMPOSITE LAMINATED STRUCTURE REINFORCED BY INSERTING PINS, A METHOD AND A APPARATUS FOR MAKING THE SAME AND A METHOD FOR MAKING THE APPARATUS

(75) Inventors: Ik Hyeon Choi, Daejeon (KR); In Hee Hwang, Daejeon (KR); Eung Tai Kim, Daejeon (KR); Seok Min Ahn, Daejeon (KR); Chan Hong Yeom, Daejeon (KR); Dae Sung Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 17 days.

(21) Appl. No.: 12/532,844

(22) PCT Filed: Sep. 8, 2008

(86) PCT No.: PCT/KR2008/005293
§ 371 (c)(1),
(2), (4) Date: Sep. 24, 2009

(87) PCT Pub. No.: WO2009/038301
PCT Pub. Date: Mar. 26, 2009

(65) Prior Publication Data
US 2010/0167039 A1    Jul. 1, 2010

(30) Foreign Application Priority Data
Sep. 17, 2007   (KR) .................. 10-2007-0093965

(51) Int. Cl.
*B29C 65/56*  (2006.01)
*B29C 65/08*  (2006.01)
*B32B 37/00*  (2006.01)
*B32B 43/00*  (2006.01)

(52) U.S. Cl. ........... 156/423; 156/92; 156/289; 156/581
(58) Field of Classification Search ............... 156/91, 156/92, 289, 306.6, 306.9, 307.1, 307.3, 156/307.4, 307.7, 381, 382, 423, 580, 581
See application file for complete search history.

(56) References Cited

U.S. PATENT DOCUMENTS

| | | | |
|---|---|---|---|
| 4,808,461 A | 2/1989 | Boyce et al. | |
| 5,186,776 A | 2/1993 | Boyce et al. | |
| 5,589,015 A | 12/1996 | Fusco et al. | |
| 5,667,859 A | 9/1997 | Boyce et al. | |
| 5,800,672 A | 9/1998 | Boyce et al. | |
| 5,868,886 A * | 2/1999 | Alston et al. | 156/98 |
| 5,919,413 A | 7/1999 | Avila | |
| 6,190,602 B1 | 2/2001 | Blaney et al. | |
| 6,291,049 B1 | 9/2001 | Kunkel et al. | |
| 6,405,417 B1 | 6/2002 | Sheehan et al. | |
| 6,436,507 B1 | 8/2002 | Pannell | |
| 6,984,277 B2 * | 1/2006 | Morrison et al. | 156/89.11 |

FOREIGN PATENT DOCUMENTS

| | | |
|---|---|---|
| JP | 05-251870 | 9/1993 |
| JP | 10-511052 | 10/1998 |
| JP | 3969302 | 6/2007 |

* cited by examiner

*Primary Examiner* — Sing P Chan
(74) *Attorney, Agent, or Firm* — Lowe Hauptman Ham & Berner, LLP

(57) ABSTRACT

A composite laminated structure is reinforced by inserting pins into a device for manufacturing a composite laminated structure. The device has a bottom guide on a composite laminated structure in a pre- or post-cured state. The device has first vertical pins that are inserted into the composite laminated structure. A top guide, on the bottom guide, has guide pins that are movable in a vertical direction at positions corresponding to the first pins.

5 Claims, 4 Drawing Sheets

[Figure 1]
PRIOR ART
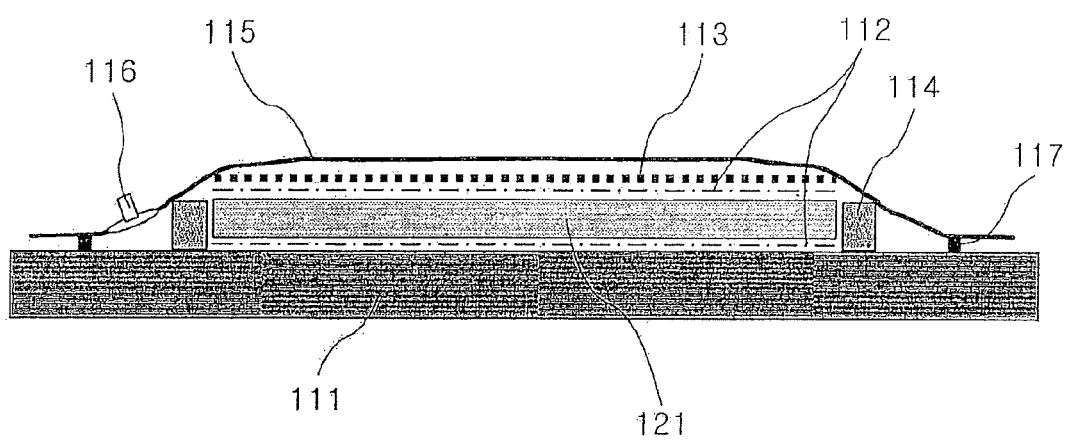
[Figure 2]
PRIOR ART
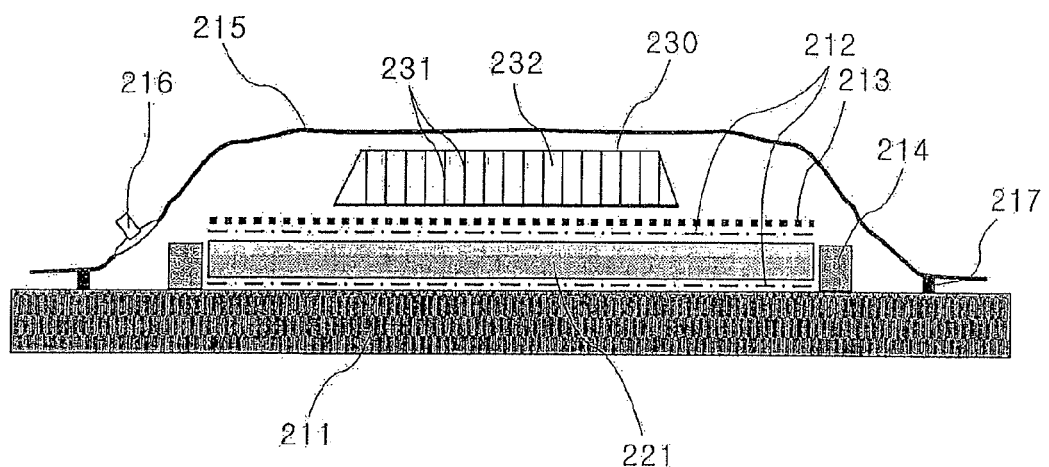

[Figure 3] PRIOR ART
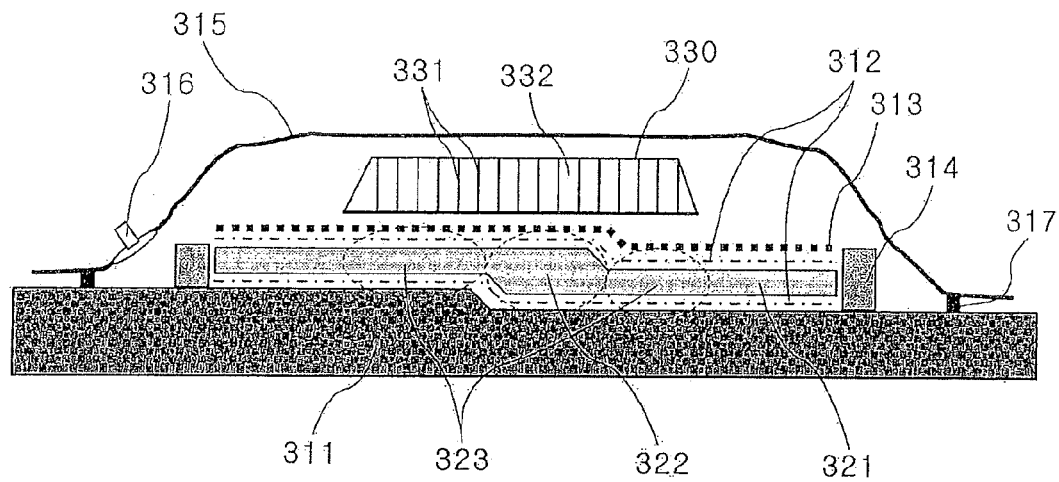
[Figure 4]
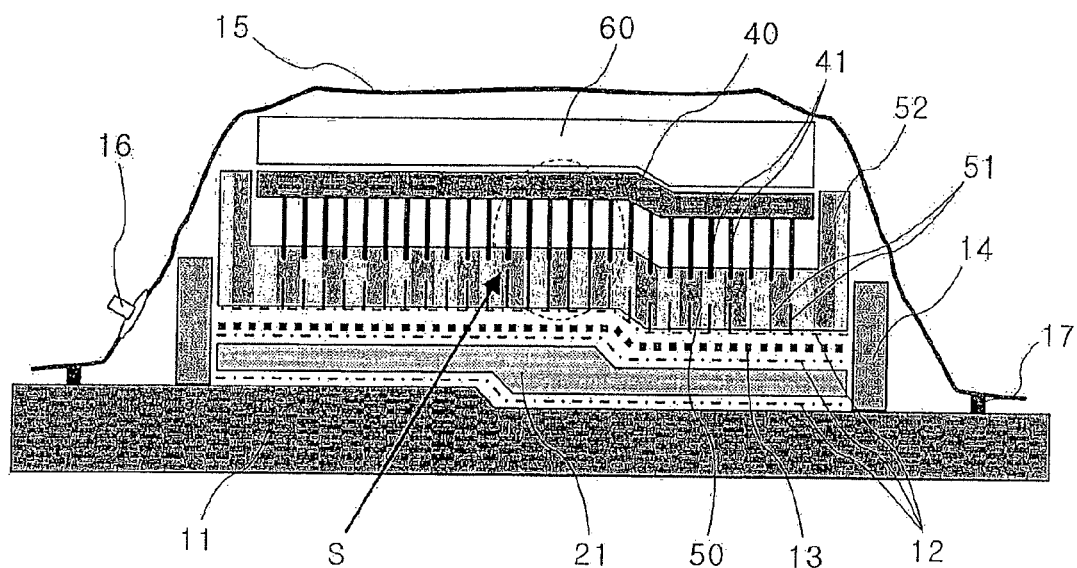

[Figure 5]
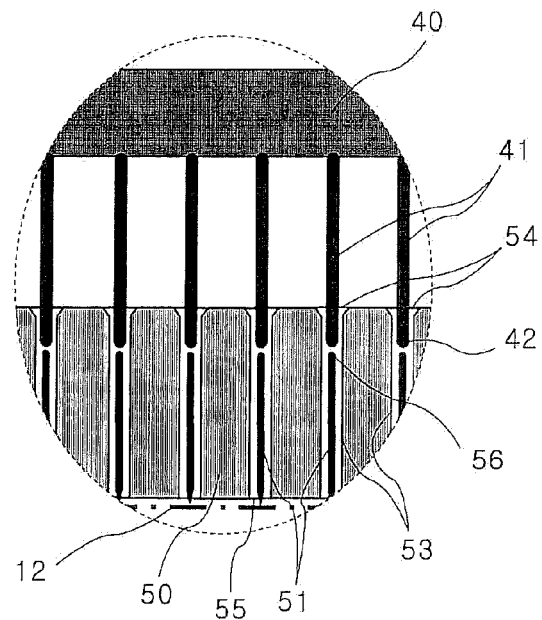
[Figure 6]
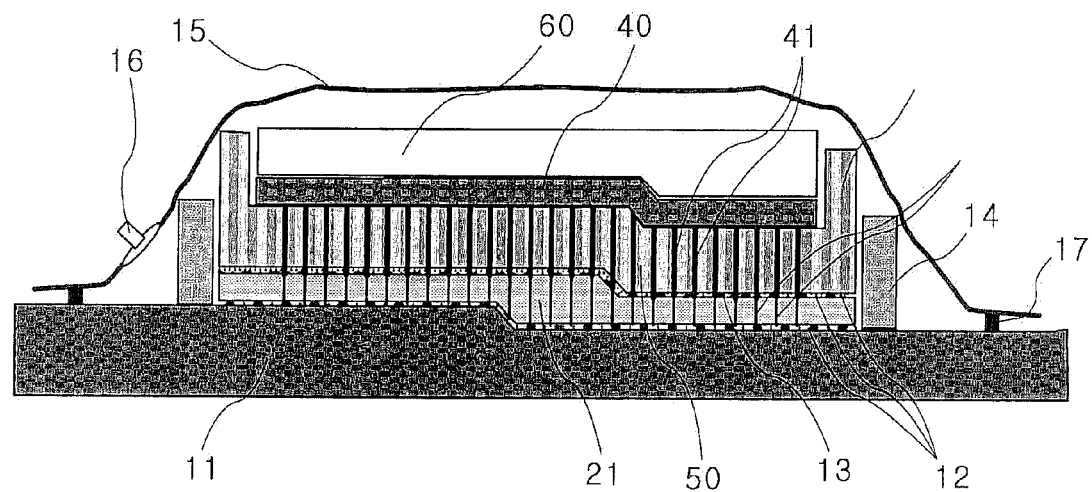

[Figure 7]
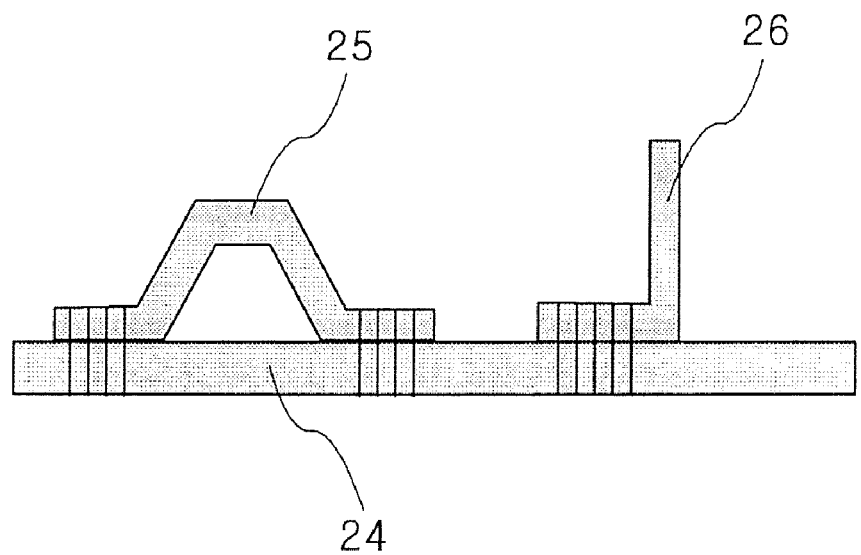

COMPOSITE LAMINATED STRUCTURE REINFORCED BY INSERTING PINS, A METHOD AND A APPARATUS FOR MAKING THE SAME AND A METHOD FOR MAKING THE APPARATUS

RELATED APPLICATIONS

The present application is based on, and claims priority from, KR Application Number 10-2007-0093965, filed Sep. 17, 2007, and PCT Application Number PCT/KR08/005,293, filed Sep. 8, 2008, the disclosures of which are hereby incorporated by reference herein in their entireties.

TECHNICAL FIELD

The present invention relates to a composite laminated structure in which the performance is reinforced by inserting pins, or multiple laminated members are connected in such a manner that the inter-layer performance of the composite laminated structure is reinforced by inserting pins in a direction of the thickness of the composite laminated structure, or multiple laminated members are attached and connected, a method and an apparatus for manufacturing the composite laminated structure, and a method for producing the apparatus.

Most of fiber-reinforced composite materials, mainly used in a light structure such as a structural member for aerospace and transportation equipment, or the like, are manufactured by laminating uni-directional or woven prepregs and performing a curing process in which the prepregs are heated and pressed. Such a laminated and cured composite structure has no separate reinforcement in a thickness direction so that there occurs an inter-layer separation phenomenon that the layers are easily separated from one another by external shock or the like. Since this inter-layer separation deteriorates the strength of a composite laminated structure, many methods for preventing the problem have been studied by researchers in the related field. In other words, studies on many methods for reinforcing a fragile inter-layer separation characteristic of the composite laminated structure, such as stitching, z-pinning, textile, and toughened matrix, have been performed.

BACKGROUND ART

Among studies for enhancing the inter-layer strength of a composite laminated structure, or connecting between two composite laminated members, z-pinning technology is a relatively recently started field. Conventional studies that have been known for z-pinning can be summarized as follows.

The initial concept of z-pinning may be seen from U.S. Pat. No. 4,808,461 issued on Feb. 28, 1989 (hereinafter, "prior art 1"). The gist of the prior art 1 is to insert pins into the inside of laminated plates while the preform is collapsed by high temperature and high pressure during a curing process by placing and curing a so-called "reinforcing structure," in which pins are inserted into a polyvinyl-series form in the thickness direction, a thin stainless plate is attached on the top, and a release film is attached on the bottom, on the top of a composite material for lamination at the time of curing (refer to FIG. 1). When the curing is completed, the residue of the collapsed and compressed preform is removed and the protruded pins are broken by physical force to be removed as much as the thickness, and thus the performance of inter-layer separation will be enhanced because pins are inserted and remained within the laminated structure in a direction of the laminated thickness. Though the prior art 1 is characterized by such a method and the above-mentioned "reinforcing structure," it has not yet been known that the concept of the invention has lately been put to practical use.

After that, in U.S. Pat. No. 5,186,776 issued on Feb. 16, 1993 (hereinafter, "prior art 2"), there is disclosed a mechanical device and a method thereof capable of a series of operations in which pins are directly cured from a composite reinforcement fiber bundle, and ultrasonic vibration is added to the cured pins to be inserted into the composite structure, and furthermore, in U.S. Pat. No. 5,589,015 issued on Dec. 31, 1996 (hereinafter, "prior art 3"), there is disclosed a method and a system in which pins are inserted into a composite structure in a pre- or post-cured state by compressing pins to the pre-inserted compressible "form body" while adding vibration using an ultrasonic device. It is known that the prior art 3 has been commercialized for practical use to be utilized in a connecting joint of the afterbody duct structure of F/A-18 E/F. Thereafter, there have been U.S. Pat. Nos. 5,667,859 (1997), 5,800,672 (1998), 6,190,602 (2001), 6,291,049 (2001), 6,405,417 (2002), 6,436,507 (2002), or the like, and the initial concept using "reinforcing structure" or "form body" is continuously maintained.

FIG. 1 is a view illustrating a general method of curing a composite. On a cur 111 for curing a composite, a release agent 112 is applied, and composite laminated prepregs 121 is placed, and again a release agent 112 and a bleeder 113 for absorbing excessive resin is laid, and all the above are covered with a film back 115 attached by an adaptor 116 for providing vacuum, and then the fringe is sealed with a sealant 117. There are instances where a cork dam 114 may not be used according to a curing process for curing a composite laminated structure 121.

FIG. 2, as a view illustrating a conventional method of z-pinning, shows a concept of the prior art 1. When placing and curing a "reinforcing structure 230" as illustrated in FIG. 2 in which pins 231 are inserted into a compressible form 232, a stainless plate is attached on the top, and a release film is attached on the bottom, pins 231 are inserted into the inside of composite laminated prepregs 221 while a form 232 is collapsed by curing pressure and curing temperature.

FIG. 3, as another view illustrating a conventional method of z-pinning, shows a case where a composite structure having an irregular thickness is cured using a conventional z-pinning method. When the composite structure having an irregular thickness is cured by a conventional z-pinning method, it gets into trouble because a stainless plate on the top of a "reinforcing structure 330" may prevent the transformation. Even though a "form body" which is not attached with a stainless plate is used, when a "form body (similar to 330, 230)" having a regular length of pins 331 is used, it is difficult to satisfy all the conditions because the composite may include a thick portion 322 and a thin portion 323 in its thickness. In other words, if the length of pins 331 is adjusted to the thick portion 322, it may not satisfy a fundamental requirement of composite curing (during a curing step, it is required that a high pressure of 7-8 atm or about 20 atm according to the material should be applied to a composite laminated prepregs in order to remove bubbles and voids created inside the composite laminated structure and discharge excessive resin) because the length of pins 331 is long for the thin portion 323 and thus curing pressure may not be applied to the composite laminated prepregs 323. Furthermore, if the length of pins 331 is adjusted to the thin portion 323, there occurs a phenomenon that pins are inserted into only a part of the laminated structure in a direction of the thickness because the length of pins 331 is short for the thick portion 322, and thus an effect of z-pinning cannot be sufficiently achieved. Accordingly, in order to cure a composite structure having an irregular thickness using a conventional method of z-pinning, it should be made by changing a thickness of the "form body 330" based on a thickness of the laminated structure, but this process may not be easily achieved due to a characteristic of the structure of compressible form 322.

As described above, according to conventional prior arts, a so-called "form body" ("reinforcing structure" may be seen as a kind of "form body") having a characteristic that pins are inserted in advance in a form to insert the pins into the composite laminated structure, and pins are inserted into the inside of the composite laminated structure while the form being compressed and broken by outside vibration load or curing pressure, is used as a mediator, and this "form body" is a feature of the technology. However, in a case where the "form body" is utilized using such a conventional technology, material waste and process inefficiency cannot be avoided because the compressed and broken form should be artificially removed after pins are inserted, and also the protruded portion of pins should be forcibly fractured and removed.

Moreover, a method of inserting pins into a composite laminated structure using such a form body or reinforcing structure has a great problem that inter-layer strength becomes irregular according to its position in a composite laminated structure having an irregular thickness, which has been produced by the prior art, because the inserted depth of pins is varied according to the thickness in a case where the thickness of the composite laminated structure is irregular. In addition, a conventional method of z-pinning to a composite laminated structure having an irregular thickness has also a problem that it cannot be easily applied since the construction of the equipment is complicated and the process is very difficult to achieve.

DISCLOSURE

Technical Problem

Accordingly, the present invention is contrived to solve the problem of conventional technologies as described above, and an object of the invention is to provide a composite laminated structure in which the performance is reinforced by inserting pins in such a manner that pins can be inserted while repetitively reusing the relevant jigs without using such an one-time-use "form body", and a method and an apparatus for manufacturing the composite laminated structure, and a method for producing the apparatus.

Furthermore, another object of the invention is to provide a composite laminated structure in which the performance is reinforced by inserting pins in such a manner that pins having a length, which is accurately matched to a final thickness of the post-cured composite laminated structure, are inserted into the inside of a composite laminated structure in order to insert pins as much as the required depth for every position.

Technical Solution

A device for manufacturing a composite laminated structure according to the present invention to accomplish an object as described above is characterized by comprising a bottom guide 50 placed on a composite laminated structure 21 in a pre- or post-cured state, and including pins 51 that are inserted into the composite laminated structure 21 respectively in a plurality of holes 53 formed in a vertical direction; and a top guide 40 placed on the bottom guide 50, and including guide pins 41 that are formed movable in a vertical direction at positions corresponding to the pins 51.

Furthermore, the device for manufacturing a composite laminated structure is characterized by further comprising a load adding means 60 that is placed on the top guide 40 to add more load to the top guide 40 in such a manner that the guide pins 41 are inserted into the holes 53 to press the pins 51, and thereby to be inserted into the composite laminated structure 21 in a pre- or post-cured state.

Furthermore, the load adding means 60 is characterized by adding load using any one or more physical forces which are selected from pressure load addition by curing pressure, vibration load addition by ultrasonic wave or vibration, and gravitation load addition by a gravitational substance.

Furthermore, the pins 51 is characterized by having a length as same as a thickness of the composite laminated structure 21 in a post-cured state, respectively at positions to be inserted.

Furthermore, the bottom guide 50 is characterized by being attached at its lower surface to a film 12 for preventing a deviation of the pins 51 prior to the process for inserting into the composite laminated structure 21 in a pre- or post-cured state.

Furthermore, a fringe 52 of the bottom guide 50 is characterized by being formed in a vertical direction in such a manner that a movement of the top guide 40 can be guided only in a vertical direction. At this time, a guiding portion of the bottom guide 50 corresponding to the fringe 52 is characterized by being formed at its fringe.

Furthermore, the pins 51 are characterized by being formed in such a manner that the top edge 56 has a flat shape, which is advantageous for load transmission, and the bottom edge 55 has a sharp shape, which is advantageous for insertion.

Furthermore, the guide pins 41 are characterized by being formed in such a manner that the bottom edge 42 has a flat shape, which is advantageous for load transmission.

Furthermore, the holes 53 are characterized by being formed by having pipes or tubes therewithin.

Furthermore, the top guide 40 and bottom guide 50 are characterized by being made of a metal or composite material.

Moreover, for a producing method for a manufacturing device of a composite laminated structure according to the present invention, a method for producing a manufacturing device of a composite laminated structure as described above is characterized by comprising the steps of: a1) laminating prepregs to form a composite laminated structure 21, or placing the composite laminated structure 21 in a post-cured state; b1) placing a release film 12 on the composite laminated structure 21; c1) laminating a prepreg for the bottom guide with a thickness reflecting a length of the guide pins 41; d1) placing a release film 12 on the laminated prepreg for the bottom guide; e1) laminating a prepreg for the top guide with a thickness adequate to fix the guide pins 41 on the release film 12; f1) applying curing pressure onto the laminated prepreg for the top guide to cur the composite laminated structure 21, a body of the top guide 40, and a body of the bottom guide 50 at the same time; and g1) having the guide pins 41 in the cured body of the top guide 40, and forming the holes 53 in the body of the bottom guide 50.

Moreover, for a method for manufacturing a composite laminated structure according to the present invention, a method for manufacturing a composite laminated structure using a manufacturing device of the composite laminated structure as described above is characterized by comprising the steps of: a2) placing a composite laminated structure 21 in a pre- or post-cured state; b2) placing a bottom guide 50 including pins 51, which are inserted into the composite laminated structure in a pre- or post-cured state, within the holes 53; c2) placing a top guide 40 including guide pins 41, which are formed at positions corresponding to the pins 51, on the bottom guide 50; and d2) inserting the pins 51 into the composite laminated structure 21 in a pre- or post-cured state by pressing the pins 51 with the guide pins 41 while the top guide 40 and the bottom guide 50 are approached to each other.

Moreover, for a method for combining composite laminated structures according to the present invention, a method for combining composite laminated structural members using a manufacturing device of the composite laminated structure as described above is characterized by comprising the steps of: a3) placing composite laminated structural members 24, 25, 26 in which a bottom composite laminated structural member 24, and top composite laminated structural members 25, 26 are sequentially arranged from the bottom, on a work table; b3) placing a bottom guide 50 including pins 51, which are inserted into the laminated composite laminated structural members 24, 25, 26 within the holes 53, on a combining portion of the laminated composite laminated structural members 24, 25, 26; c3) placing a top guide 40 including guide pins 41, which are formed at positions corresponding to the pins 51, on the bottom guide 50; and d3) inserting the pins 51 into the composite laminated structure 21 in a pre- or post-cured state by pressing the pins 51 with the guide pins 41 while the top guide 40 and the bottom guide 50 are approached to each other.

At this time, the bottom composite laminated structural member 24, and top composite laminated structural members 25, 26 are preferably combined through a first combining process including adhesion, compression, and thermal adhesion.

ADVANTAGEOUS EFFECTS

In producing a composite laminated structure having a weak inter-layer separation performance, the present invention has an effect of reinforcing the inter-layer separation performance, and also has an effect of connecting two composite laminated structural members by basically applying a z-pinning method in which pins are inserted in a direction of the thickness of the composite laminated structure.

In particular, according to the present invention, it has an effect of thoroughly overcoming a problem that in a conventional method of z-pinning, materials are inevitably wasted by using a one-time use "form body" (including a concept of "reinforcing structure"), and it may not be easily applicable to a case of composite laminated structures having an irregular thickness. In other words, the present invention has a great effect that material waste can be prevented by employing a concept of reusable jig, and the method may be easily applicable even in a case of composite laminated structures having an irregular thickness, and also a high-quality insertion of pins can be accomplished even for composite laminated structures having an irregular thickness.

DESCRIPTION OF DRAWINGS

The above and other objects, features and advantages of the present invention will become apparent from the following description of preferred embodiments given in conjunction with the accompanying drawings, in which:

FIG. 1 is a view illustrating a general method of curing a composite;

FIG. 2 is a view illustrating a conventional method of z-pinning;

FIG. 3 is another view illustrating the conventional method of z-pinning;

FIG. 4 is a view illustrating an initial state of a method of z-pinning according to the present invention;

FIG. 5 is a detail view illustrating the S-portion of FIG. 4;

FIG. 6 is a view illustrating a final state of a method of z-pinning according to the present invention; and FIG. 7 is a state view illustrating the connection between two composite members.

DETAILED DESCRIPTION OF MAIN ELEMENTS

| | |
|---|---|
| 11: | cur |
| 12: | (release) film |
| 13: | bleeder |
| 14: | cork dam |
| 15: | film back |
| 16: | adaptor |
| 17: | sealant |
| 21: | composite laminated prepregs |
| 24: | bottom composite laminated structural member |
| 25, 26: | top composite laminated structural member |
| 40: | top guide |
| 41: | guide pin |
| 42: | bottom edge (of the guide pin) |
| 50: | bottom guide |
| 51: | pins |
| 52: | fringe |
| 53: | holes |
| 54: | top portion (of the hole) |
| 55: | bottom edge (of the pin) |
| 56: | top edge (of the pin) |
| 60: | load adding means |

BEST MODE

Hereinafter, a composite laminated structure in which the performance is reinforced by inserting pins according to the present invention having a construction as described above, a method and an apparatus for manufacturing the composite laminated structure, and a method for producing the apparatus will be described in detail with reference to accompanying drawings.

FIG. 4 is a view illustrating an initial state of the present invention related to a composite laminated structure 21 in a pre-cured state in a z-pinning method of the invention, and FIG. 5 is a detail view illustrating the S-portion of FIG. 4 in detail. First, as in a general method of curing a composite of FIG. 1, a bottom guide 50 and a top guide 40 are sequentially arranged on the laminate of composite prepregs 21 in a pre-cured state, a release film 12, and bleeder 13. In this specification, a pre-cured state indicates a state that prepregs are laminated, and a post-cured state indicates a state that curing pressure had been applied to the laminated prepregs to complete the curing. In other words, according to the present invention, pins may be inserted in concurrence with the curing at a state that a prepreg has been laminated, or pins may be inserted into a laminated prepreg at first, and then a general process of curing a composite is performed to complete the composite laminated structure, or pins may be inserted into a cured composite laminated structure, or pins may be inserted to combine a plurality of composite laminated structures in a pre- or post-cured state. For the last case, hereinafter, it will be illustrated in detail in the description of FIG. 7.

In the bottom guide 50, as shown in FIG. 5, holes 53 are formed, and pins 51 are provided respectively therein, and guide pins 41 are provided at positions corresponding to the positions of the holes 53 (in the bottom guide 50) on a surface of the top guide 40 facing to the bottom guide 50.

As the top guide 40 and the bottom guide 50 are approached to each other, the guide pins 41 are advanced into the inside of the holes 53, and thus the pins 51 are pushed out by the guide pins 41, and ultimately the pins 51 are inserted into the composite laminated structure 21.

A length of the pins 51 to be inserted into the composite laminated structure 21 in a pre- or post-cured state are processed based on a thickness of the composite laminated structure 21 in a post-cured state. Furthermore, a lower surface of the bottom guide 50 is preferably attached to a film 12 to prevent a deviation of the pins 51. Moreover, it is advantageous for load transmission to insert the pins 51 when a top edge 56 of the pins 51 and a bottom edge 42 of the bottom guide 50 are processed to be a flat shape, and it is advantageous for insertion when a bottom edge 55 of the pins 51 is processed to be a sharp shape. Furthermore, the guide pins 41 can be easily guided to the holes 53 by processing a top portion 54 of the holes 53 to be a flat head shape or the like.

In producing the holes 53, it may be difficult to process a fine holes on a body of the bottom guide 50 because the pins 51 and the guide pins 41 have a slender shape. In such a case, a diameter of the holes 53 can be properly adjusted by forming holes having a diameter larger than the pins 51 and the guide pins 41 in the bottom guide 50, and by inserting pipes or tubes within the formed holes. In a case where the pipes or tubes are inserted within the holes 53, when the pipes or tubes having a very low friction coefficient, i.e., slippery materials are used, it is possible to more smoothly move the pins 51 and the guide pins 41.

The guide pins 41 should move only in a vertical direction exactly at the positions of the holes 53 since the holes 53 have a small diameter allowing to pass the guide pins 41 and the pins 51. If the top guide 40 moves in a horizontal direction during the movement, the guide pins 41 will be in danger that may not be inserted into the holes 53 or broken, and also the pins 51 cannot be correctly inserted into the composite laminated structure 21 because they are not properly supported by the guide pins 41. Accordingly, a fringe 52 of the bottom guide 50 is preferably formed in a shape for guiding a movement of the top guide 40 in order to move the top guide 40 only in a vertical direction while not moving in a horizontal direction.

In particular, when the bottom guide 50 and the top guide are sequentially arranged on a composite laminated structure 21 in a pre-cured state, and then a film back 15 is covered thereon to cure in a similar way to a general method of curing a composite laminated structure, in case of a pre-cured state, pins are inserted while the laminated prepreg is formed as a composite laminated structure, thereby resulting in the formation of a composite laminated structure inserted with pins.

In addition, it is preferable to provide a load adding means 60 for facilitating the insertion of pins 51 onto the bottom guide 50 and the top guide 40. For such a load adding means 60, it is possible to use a variety of means for adding physical force, such as pressure load addition by curing pressure, vibration load addition by ultrasonic wave or vibration, and gravitation load addition by a gravitational substance. As illustrated in FIG. 4, when a film back 15 is covered and curing pressure is added from an outside of the film back 15, it is not required to have a separate hardware for the load adding means 60.

As described above, the present invention includes a concept that a composite laminated structure inserted with pins is formed after curing by inserting pins into a laminated prepreg through a curing process. In addition, the present invention also includes a concept that pins are inserted into a laminated prepreg at a prepreg laminating step, then a composite laminated structure is completed through a curing process, and in such a case pins are inserted into a laminated prepreg at first, then it is cured by applying a general method of curing a composite laminated structure to the laminated prepregs inserted with pins. Furthermore, even in case of a cured composite laminated structure, it is possible to insert pins using a method and a device according to the present invention by use of a high-frequency vibration load adding device which utilizes a ultrasonic vibration device, or the like.

FIG. 6 is a view illustrating a final state of a method of z-pinning in which pins are inserted through a curing process for a composite laminated structure in a pre-cured state among various concepts of the invention. If a method of z-pinning according to the present invention is used, as illustrated in FIG. 4, the pins 51 having a long length are contacted with guide pins 41 at first to be inserted into the inside of a composite laminated structure 21. Later, all the pins 51 are contacted with guide pins 41 to be inserted into the inside of a composite laminated structure 21, and then the pins 51 are inserted into the composite laminated structure 21 until the top guide 40 and the bottom guide 50 are contacted to each other. Load by a load adding means 60 is transmitted to an entire composite laminated structure 21 when the top guide 40 and the bottom guide 50 are contacted to each other, and the discharge of excessive resin is allowed in a case where as a view illustrated above a composite laminated structure in a pre-cured state is related and pins are inserted through a curing process, thereby satisfying a fundamental requirement of curing a composite that may not be satisfied by a conventional method of z-pinning as described in the description of FIG. 3. Of course, when the load by a load adding means 60 is transmitted to an entire composite laminated structure 21, a certain portion of the composite laminated structure is compressed, but a bottom edge 55 of the pins 51 should be contacted with a cur 11 at a finally compressed state. For this, a length of the pins should be exactly decided and determined by utilizing testing, experience, or the like in advance.

The top guide 40 and bottom guide 50 may be produced using a metal or composite material. In a case where the top guide 40 and bottom guide 50 are produced using a composite material, it is possible to produce an essential composite laminated structure 21, and composite structures for the top guide 40 and the bottom guide 50 at the same time by laminating a composite laminated structure 21 in a prepreg state to be produced or placing a cured composite laminated structure 21 at first, i.e., placing a composite laminated structure 21 in a pre- or post-cured state on a cur 11 or release film 12, applying the release film 12 to the top portion (add a bleeder 13, if required), laminating a prepreg for the bottom guide with an adequate thickness reflecting a length of the guide pins 41, applying a release film 12 again, and then laminating a prepreg for the top guide with a thickness adequate to fix the guide pins 41 to cure. Holes 53 are processed in the produced composite structure for the bottom guide 50, and guide pins 41 are fixed in the composite structure for the top guide 40. At this time, in a case where it is difficult to process fine holes 53 as described above, the diameter of holes may be adjusted by processing slightly larger holes, and then inserting pipes or tubes. The guide pins 41 may be produced to be thicker than the pins 51, and as a result the structural durability of guide pins 41 is enhanced to facilitate the repetitive use of top guide 40. In a fringe 52 of the finally produced bottom guide 50, a function capable of guiding the movement of top guide 40 only in a direction of the thickness of the laminated structure is added.

FIG. 7 is a state view illustrating the connection between two composite laminated structural members, and it is shown that a method of the invention may be even applied to the connection between two composite laminated structural members in a pre- or post-cured state. When this concept is used in the connection between a bottom composite laminated structural member 24, and top composite laminated structural members 25, 26, it is possible to avoid the use of a metal rivet or bolt, thereby advantageous in the lightweight aspect.

It is to be understood that the present invention is not limited to the embodiments described above, but encompasses any and all embodiments within the scope of the following claims, and it is appreciated that various modifications can be made by those people skilled in the art of this invention without departing from the gist of the invention.

The invention claimed is:

1. A device for manufacturing a composite laminated structure into which pins are inserted to reinforce in the inter-layer performance or to attach and connect a plurality of laminated members to one another, comprising:
   a bottom guide located on a composite laminated structure in a pre- or post-cured state, the bottom guide including first pins that are inserted into a plurality of corresponding vertical holes formed in the bottom guide; and
   a top guide on the bottom guide, and the top guide including guide pins that are vertically movable at positions corresponding to the first pins,
   wherein a lower surface of the bottom guide is attached to a film to prevent deviation of the first pins prior to the process for inserting into the composite laminated structure in the pre- or post-cured state.

2. The device for manufacturing a composite laminated structure according to claim 1, further comprising:
   a load adding means that is located on the top guide to add more load to the top guide in such a manner that the guide pins are inserted into the holes to press the pins, and thereby to be inserted into the composite laminated structure in a pre- or post-cured state.

3. The device for manufacturing a composite laminated structure according to claim 2, wherein the load adding means adds load using any one or more physical forces which are selected from pressure load addition by curing pressure, vibration load addition by ultrasonic wave or vibration, and gravitation load addition by a gravitational substance.

4. The device for manufacturing a composite laminated structure according to claim 1, wherein the holes have walls formed by pipe or tube walls in the holes.

5. The device for manufacturing a composite laminated structure according to claim 1, wherein the top guide and bottom guide are made of a metal or composite material.

* * * * *